Jan. 31, 1956   F. WALLER   2,732,758
MAGAZINE SLIDE PROJECTOR
Filed May 26, 1950   6 Sheets-Sheet 1

INVENTOR
Fred Waller
BY
Emery, Varney, Whittemore & Dix
ATTORNEY

Jan. 31, 1956 F. WALLER 2,732,758
MAGAZINE SLIDE PROJECTOR
Filed May 26, 1950 6 Sheets-Sheet 3

INVENTOR
Fred Waller
BY
Emery, Varney, Whittemore & Dix
ATTORNEY

Jan. 31, 1956 F. WALLER 2,732,758
MAGAZINE SLIDE PROJECTOR
Filed May 26, 1950 6 Sheets-Sheet 4
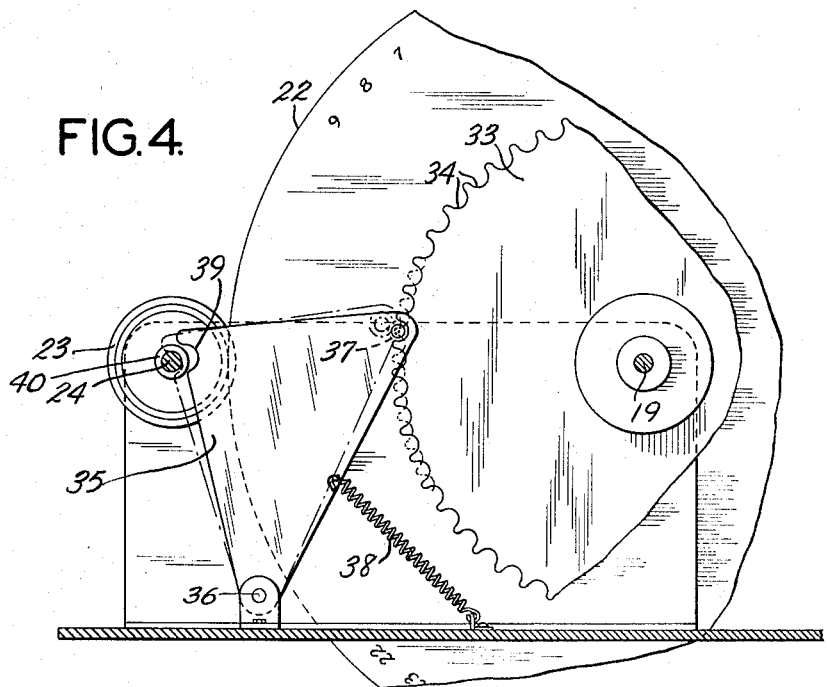
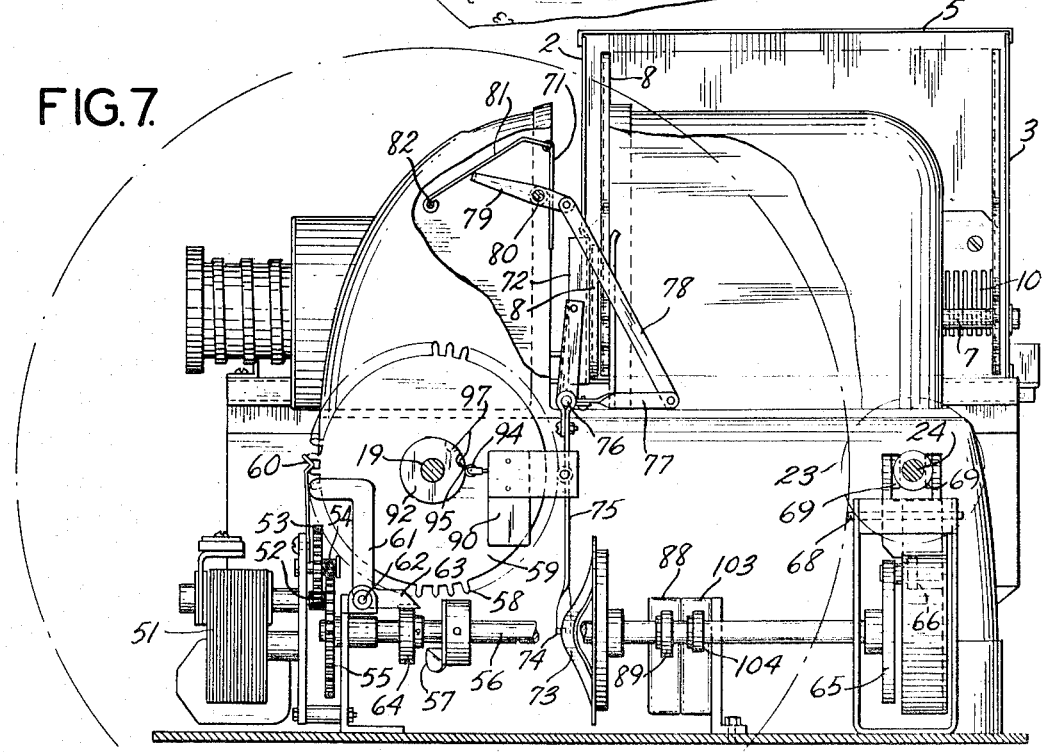
INVENTOR
Fred Waller
BY
ATTORNEY

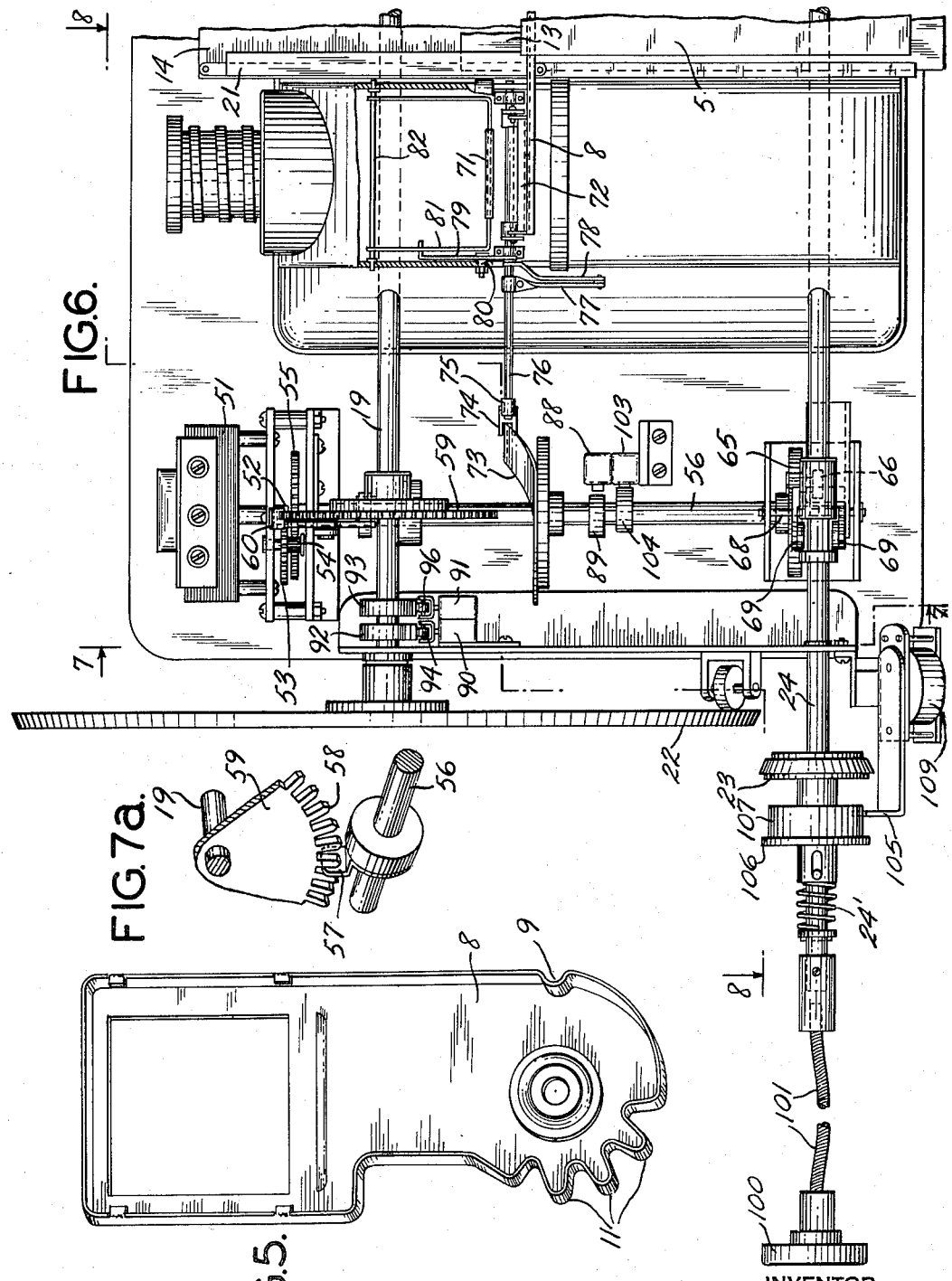

United States Patent Office 2,732,758
Patented Jan. 31, 1956

2,732,758

MAGAZINE SLIDE PROJECTOR

Fred Waller, Huntington, N. Y., assignor to The Vitarama Corporation, Huntington Station, N. Y., a corporation of New York Application May 26, 1950, Serial No. 164,332

11 Claims. (Cl. 88—28)

This invention relates to apparatus for projecting pictures from slides, the term "slides" being used herein in the sense in which it is commonly used in the photographic industry to denote a transparent plate or film carrying a photographic image to be projected.

It is an object of the present invention to provide an apparatus in which a group of slides, preferably carried in a magazine, may be inserted, and in which the observer may select any slide of the group for projection and may move the selected slide to projecting position.

It is a further object of the invention to provide manually operated means for selecting the desired slide, and for moving the selected slide to projecting position.

It is a further object of the invention to provide as an alternative to said manually operated means, manually controlled electrically operated means for selecting the desired slide and for moving the selected slide to projecting position, in cases where this may be desirable.

Other objects and advantages of the invention will appear hereinafter.

A preferred embodiment of the invention selected for purposes of illustration is shown in the accompanying drawings, in which, Figure 1 is a top plan view of the apparatus, partly broken away.

Figure 2a is a detail of the magazine showing an alternative means of holding the slide carriers therein.

Figure 4 is a section on the line 4—4 of Figure 1.

Figure 5 is a perspective view of a slide carrier.

Figure 6 is a top plan view of a modified form of apparatus.

Figure 7 is a section on the line 7—7 of Figure 6.

Figure 7a is a detail view, in perspective, showing the cam segment which operates the magazine.

Figure 1:
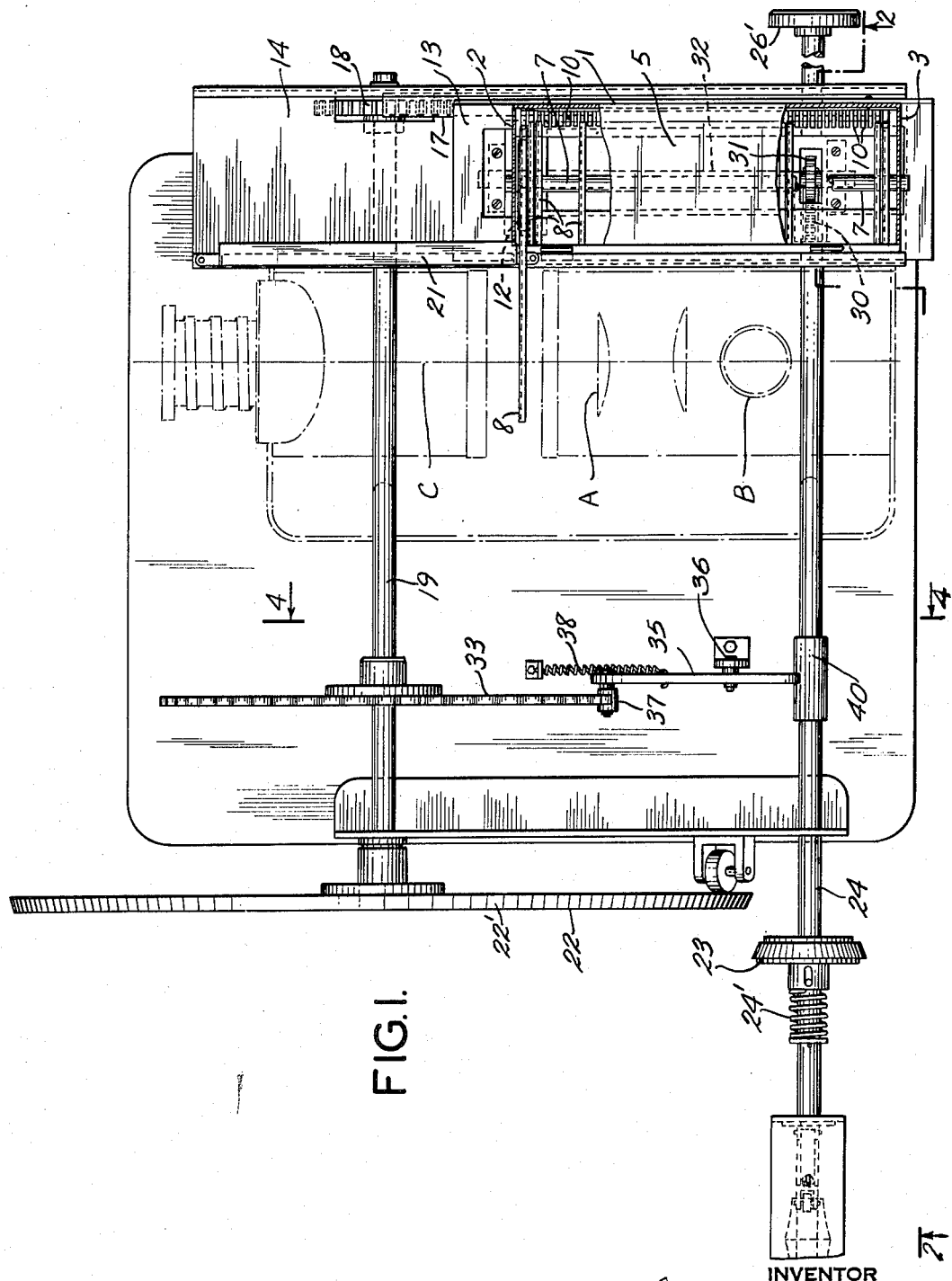

Referring to the drawings, in the interests of simplification, the optical system A and light source B required for projecting images from slides are merely indicated diagrammatically, since these components of a complete projector may be of any desired type and form no part of the present invention. The axis of projection is, however, indicated by the construction line C, and the plane of projection hereinafter referred to is at right angles to the axis of projection. In projecting slides as hereinafter described, an entire group of slides carried in a magazine may be moved to bring any selected slide into the plane of projection, after which the selected silde may be moved to intercept the axis of projection.

The slide magazine 1 is rectangular in shape having end walls 2, 3, a back wall 4 and a top wall 5. The front of the magazine is open, and the bottom wall 6 is provided with a wide slot 6'. A rod 7 extends lengthwise of the magazine, carried on the end walls, and a plurality of slide carriers 8 are pivotally mounted on the rod 7. Any suitable number of slide carriers may be used, approximately fifty being shown for example.

The individual slide carriers are spaced closely along the shaft, being separated merely by washers of thickness sufficient to prevent frictional contact between opposed faces of the carriers. Each carrier may be provided with a notch 9 adapted to engage a spring detent 10 mounted on the back wall to hold the carriers in their normal upright position in the magazine. Alternatively, in place of the notches and detents, a permanent magnet 10' may be mounted on the back wall, as shown in Figure 2a, to engage and hold the carriers in upright position. The lower curved edge of each carrier is provided with a series of teeth 11 adapted to be engaged by a toothed segment 12 as hereinafter described.

When inserted in the projector, the magazine rests on a platform 13 carried in a frame 14. One or more pins 15 on the platform engage one or more apertures of the magazine so that the magazine is caused to move with the platform as the latter is moved. For moving the platform 13 a rack 17 extends lengthwise of the platform, which said rack is engaged by a pinion 18 mounted on shaft 19. Rotation of the pinion causes the platform and magazine to move along the frame so that any slide carrier in the magazine may be brought to a position opposite, i. e. in the same plane as the toothed segment 12. This is the plane of projection previously referred to. The frame 14, of course, is constructed to guide the platform 13 so that its movement is in a direction parallel to the axis of projection.

Figure 3:
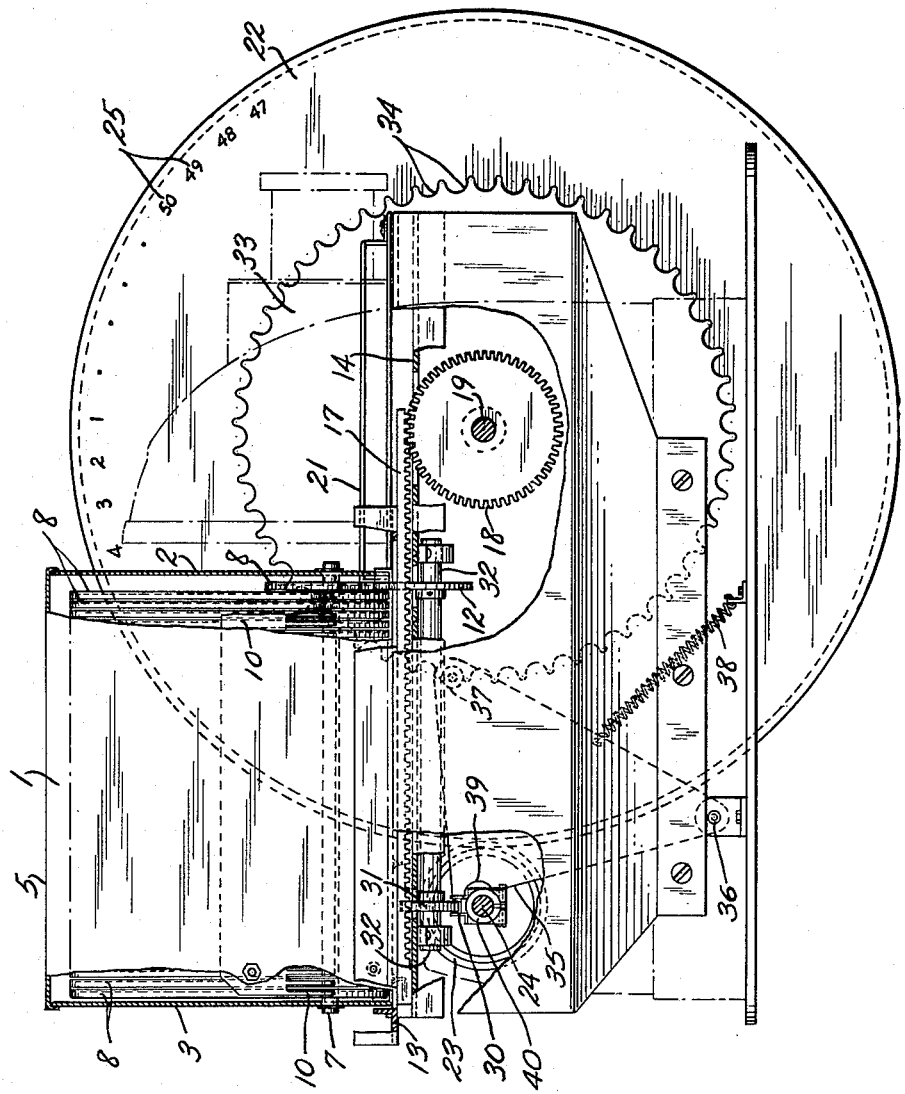
Figure 3 is a front elevation, partly broken away.

The magazine may be inserted in or removed from the platform 13 only when the platform is in its extreme position, i. e. with the end slide carrier beyond the plane of projection. As shown in Fig. 3, the end slide carrier is in the plane of projection, and as soon as the platform and magazine are moved to or beyond this position, the notch 20 in the end wall 3 engages the rail 21 on the frame, thus locking the magazine to the platform so that it cannot be removed until it is returned to its extreme position.

The means for moving the slide and magazine includes a large disk 22 mounted on shaft 19 and a smaller disk 23 mounted on rod 24. The disk 22 is intended to be located behind a wall of the casing of the projector and carries a series of numerals 25 which may be exposed through a suitable window in the wall so that the observer, by bringing any desired numeral before the window may select the particular slide which is to be projected. The rod 24 projects through the wall of the casing and carries knobs 26, 26' by which it may be operated.

The rod 24 is capable of rotational and translational movement, the latter movement being limited in both directions by a collar 27 within the bracket 28. A spring pressed roller 29 may be employed to roll against oppositely curved cam surfaces of the collar so that when the rod is pushed or pulled beyond its mid position, the spring pressure assists the travel to the limit position.

Figure 2:
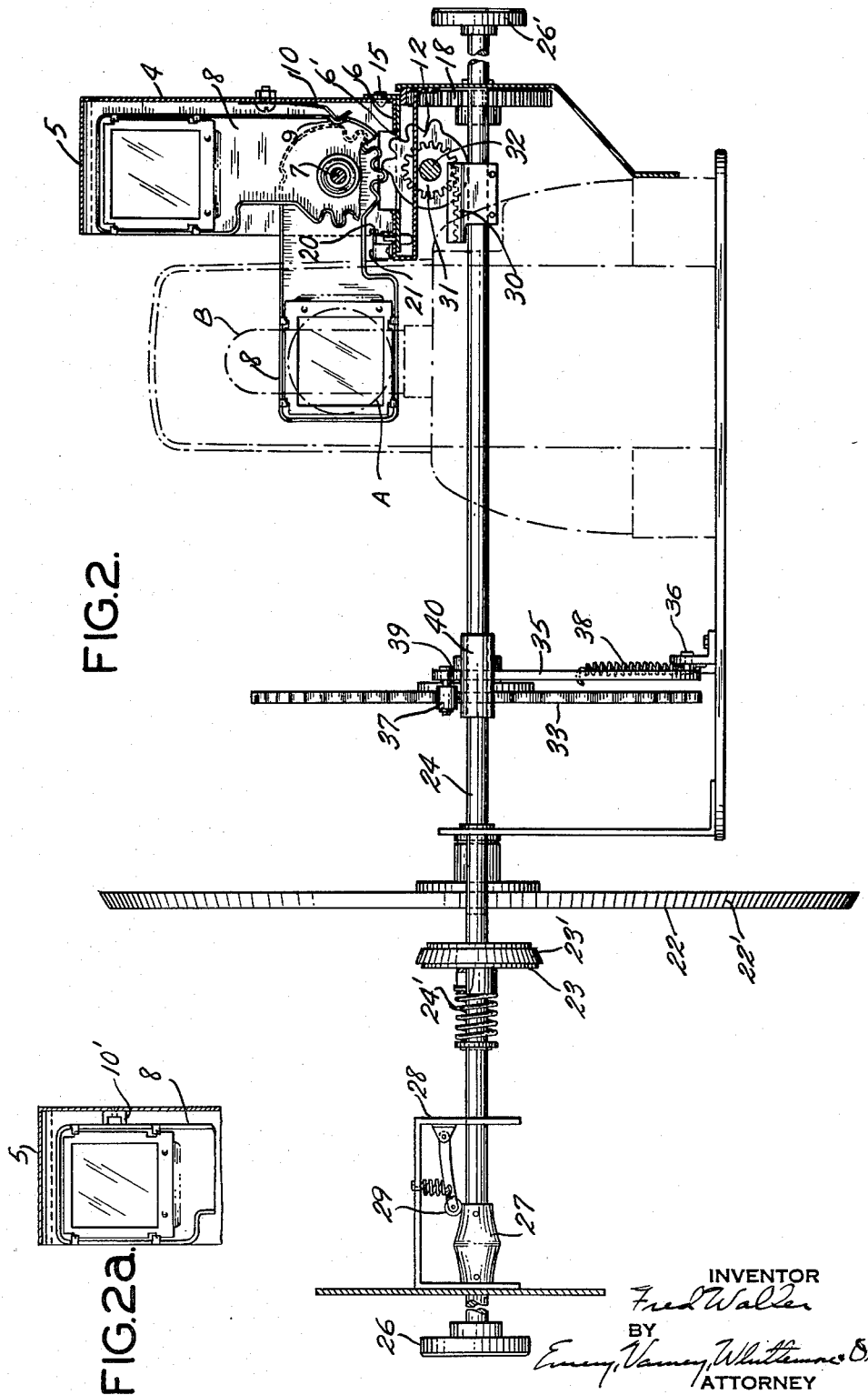
Figure 2 is a side elevation, partly in section on the line 2—2 of Figure 1.

When the rod is moved to the right, as shown in Figures 1 and 2, the beveled edge 23' of disk 23 engages the beveled edge 22' of the disk 22 to establish frictional contact so that rotation of either of the knobs 26, 26' will cause rotation of disk 22 and shaft 19 to cause movement of the platform and magazine so that any selected slide may be moved into the plane of projection. Preferably, the disk 23 is connected to the rod by a spring 24' so that it is held in yielding engagement with disk 22.

Translational movement of the rod 24 is also utilized to move the selected slide into and out of projecting position. Thus, the rod is provided with a rack 30 which is in engagement with a pinion 31 on shaft 32 on which the segment 12 is mounted. When the rod is moved to the right as shown in Figures 1 and 2 the segment 12 is rotated to engage the teeth 11 of any slide carrier lying in the plane of projection to cause that slide carrier to move from projecting position into the magazine. When the rod is moved in the opposite direction, a slide carrier is moved from the magazine to projecting position.

It will be noted that while the knob 26 may be rotated at any time, it will be effective to cause movement of the magazine only when the rod is moved to the right. Thus, the magazine cannot be moved by the knob while a slide carrier is in projecting position. It can only be moved after the slide carrier has been returned to the magazine by moving the rod to the right.

Means are also provided to prevent translational movement of the rod 24 except when a slide carrier is positioned in the plane of projection. For this purpose a disk 33 is mounted on shaft 19, said disk having a series of notches 34 equal to the number of slide carriers in the magazine and so spaced that rotation of the disk through one notch length takes place as the magazine is moved a distance equal to the distance between slide carrier centers. A detent 35, pivoted at 36, carries a roller 37 which rides against the notched edge of the disk 33 under the influence of the spring 38. Said detent has a notch 39 positioned to receive the rod 24 but to obstruct the collar 40 secured to the rod.

Whenever a slide carrier is accurately indexed in the plane of projection, the roller 37 rests in the deepest portion of a notch 34. In this position, the detent is withdrawn from engagement with the rod and the rod may be pulled or pushed at will to move a slide carrier to projecting position or to return it to the magazine. Whenever a slide carrier is not accurately indexed in the plane of projection, however, the detent is advanced toward the rod to engage the collar 40 to lock the rod against translational movement. The collar 40 may be of a length to prevent translational movement in either direction, but bearing in mind that the magazine can only be moved by rotating the knob when the rod is pushed in, the more important function is to prevent the rod from being pulled out while rotating the knob.

In the operation of the apparatus after insertion of the desired magazine, the observer pushes the knob in, i. e. to the right as seen in Figures 1 and 2, thus bringing the disks 22 and 23 into engagement. Then, by turning the knob, any desired slide may be selected, as indicated by the numerals 25. When the desired slide is correctly indexed, the knob is pulled out, causing the selected slide to move out of the magazine into projecting position. After viewing this slide, the knob is pushed in again, restoring the slide to the magazine, and another slide may be selected by turning the knob, and projected by pulling the knob out again. It will be noted that the observer may view the slides in sequence, by advancing the magazine one slide at a time, or the observer may at any time select any slide in the magazine which it is desired to view.

In the apparatus described, it will be observed that all of the operations required for selecting a desired slide and for moving the selected slide to projecting position are performed manually by operation of the rod 24. In the modified form of apparatus shown in Figures 6, 7, 8 and 9, rotation of the shaft 19 and translation of the rod 24 are performed electrically under control of manually operated switches. In these figures of the drawings, therefore, the details of the magazine, etc. are omitted, it being understood that the shaft 19 operates a pinion 18 engaging a rack 17 to move the magazine as before. Also, the rod 24 carries a rack 30 engaging a pinion 31 to operate the slide carriers as before.

In the modified form of apparatus, the shaft 19 is rotated to move the magazine by means of a reversible electric motor 51 operating through a set of reducing gears 52, 53, 54, 55 to drive a countershaft 56 having mounted thereon a short cam segment 57 engaging teeth 58 of disk 59 mounted on shaft 19. The cam segment 57 is so arranged that one revolution of shaft 56 advances the disk 59 the width of one tooth, thus rotating the shaft 19 sufficiently to advance the magazine one slide carrier, the direction of the advance being determined by the direction of rotation of the motor. The disk 59 may be held in correctly indexed position by a spring detent 60 which engages the teeth 58. Said detent may be moved out of engagement therewith whenever the magazine is to be moved, by a crank 61 pivoted at 62 having an arm 63 engaging a cam 64 on shaft 56. The cam is so arranged that the detent 60 is pushed away from the teeth 58 as soon as shaft 56 begins to rotate, and is allowed to re-engage the teeth near the end of a complete revolution.

The translation of shaft 24 is also accomplished through rotation of shaft 56. Mounted on this shaft is a disk 65 carrying an eccentrically mounted roller 66 engaging a channel member 67 pivoted at 68 and having a yoke 69 connected to shaft 24. Rotation of the shaft 56 causes the channel member and yoke to oscillate to move the shaft 24 to the right and left as shown in Figure 6, movement to the right serving to restore a slide carrier to the magazine and movement to the left serving to move a slide carrier to projecting position as previously explained. The positions of the roller 66 and the cam segment 57 with respect to the shaft 56 are such that the cam segment engages the teeth 58 to advance the magazine only after the roller 66 has oscillated the yoke 69 to move the shaft 24 far enough to restore the slide carrier to the magazine. The advancement of the magazine is then completed by the cam segment before the shaft 24 begins to move in the opposite direction to move another slide carrier to projecting position.

If desired, a shutter 71 and slide clamp 72 may also be operated by rotation of shaft 56. For this purpose, a cam 73 may be mounted on shaft 56 to engage the forked end 74 of arm 75 connected to rod 76 which may be pivoted in the projector housing. An arm 77 is also connected to rod 76, and this arm is connected by a link 78 connected in turn to an arm 79 pivoted at 80 with its free end engaging a shutter holder 81 pivoted at 82. Also connected to the rod 76 is the slide clamp 72 which is adapted to engage any slide carrier which has been moved to projecting position to hold it firmly in projecting position. In the position shown in Figures 7 and 8 a slide carrier is in projecting position, the shutter is open and the slide clamp is in engagement with the slide carrier. As the shaft 56 begins to rotate, the rod 76 is turned in counter-clockwise direction as seen in Figure 7, thus throwing the slide clamp away from the slide carrier and releasing the same, and at the same time allowing the shutter to close. The parts remain in this position while continued rotation of shaft 56 restores one slide carrier to the magazine and moves another slide carrier to projecting position. Then, toward the end of the rotation of shaft 56, the rod 76 is turned in clockwise direction to open the shutter and clamp the slide carrier in projecting position.

Figure 9:
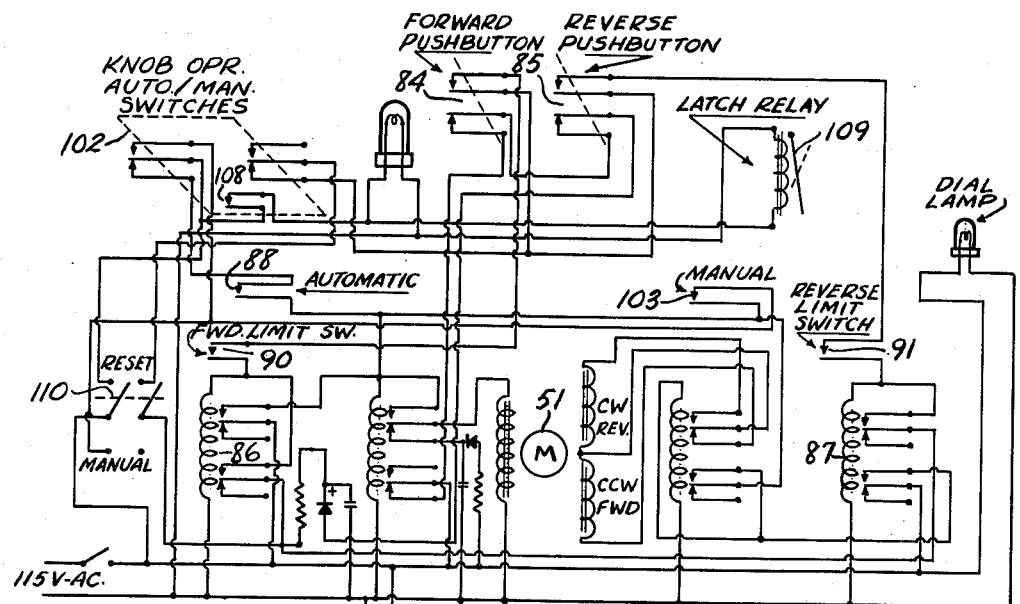
Figure 9 is a circuit diagram.
Figure 8:
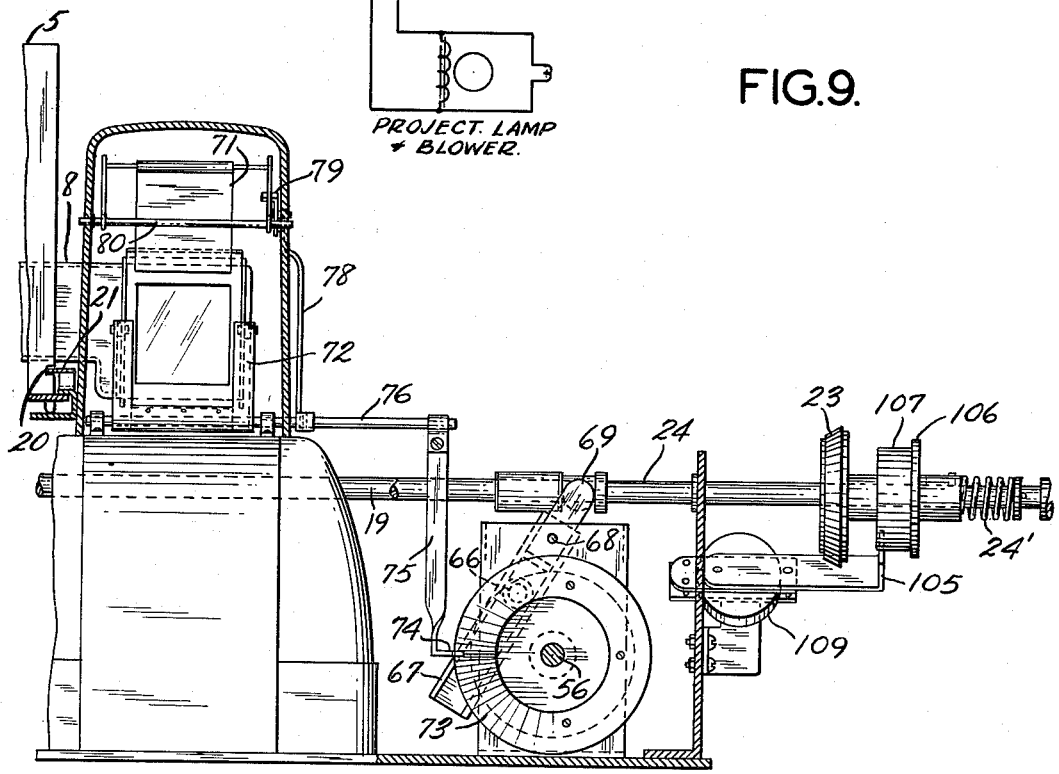
Figure 8 is a section on the line 8—8 of Figure 6.

Referring to the wiring diagram of Figure 9, the apparatus is provided with two push button switches 84 and 85 which may be located in any convenient place, one button being marked "Forward" and causing the motor 51 to operate in one direction, and the other marked "Reverse" and causing the motor to operate in reverse direction. Thus, the operator may move the magazine in either direction, as desired. Relays 86, 87 are provided so that once either of the switches 84, 85 is closed, one operating cycle will be completed. The motor 51 is stopped on completion of each operating cycle, i. e. when the shaft 56 has completed one revolution, by a limit switch 88 operated by cam 89 on the shaft 56.

Thus, when the operator presses the "Forward" button, for example, the apparatus goes through one complete cycle, returning one slide carrier to the magazine, advancing the magazine one step, and moving the next slide to projecting position, and this cycle is repeated each time the "Forward" button is pressed. Likewise, a similar cycle is completed each time the "Reverse" button is pressed, but the magazine moves in the opposite direction. When the magazine reaches the end of its intended travel in either forward or reverse direction, it is desirable to limit further movement in that direction. For this purpose limit switches 90 and 91 are provided, operated by cams 92 and 93 on shaft 19. When the magazine reaches the end of its intended forward travel, roller 94 of switch 90 drops into groove 95 of cam 92 opening switch 90 so that further motion in the forward direction is impossible. Likewise, when the magazine reaches the end of its intended reverse travel, roller 96 of switch 91 drops into groove 97 of cam 93, opening switch 91 so that further motion in reverse direction is impossible.

In addition to fully automatic operation under control of switches 84, 85, it is desirable to provide for manual selection of any desired slide which it may be desired to project out of normal sequence. That is, after viewing the slides in sequence, for example, the operator may wish to return quickly to certain selected slides for further observation. For this purpose a knob 100 is provided, connected to rod 24 by a flexible shaft 101 such that rotation of knob 100 will rotate rod 24, but pushing or pulling the knob will not move the shaft 24 longitudinally.

When it is desired to make a manual selection, the knob 100 is pushed in to operate switch 102 which starts the motor 51 in forward direction. When a half cycle of operation has been completed, limit switch 103 is opened by cam 104 on shaft 56, thus stopping the motor 51. This half cycle will operate the yoke 69 to actuate the rod 24 to return a slide carrier to the magazine, and will also release the spring detent 60. At the same time the movement of shaft 24 will bring the disk 23 into engagement with disk 22. The knob 100 may then be rotated to rotate the disks 23 and 22 to move the magazine to any desired position. When the knob is then pulled out, the motor 51 is started again to complete another half cycle, the motor then being stopped by the limit switch 88. This half cycle will again operate the yoke 69 to actuate the rod 24 in the other direction to bring the selected slide to projecting position. After viewing his slide the operator may then again advance the slides in sequence in either direction by pressing the "Forward" or "Reverse" buttons, or he may make another manual selection by pushing in the knob 100 as previously described.

In order to prevent engagement of the disks 23 and 22 when the apparatus is set for fully automatic operation under control of the "Forward" and "Reverse" buttons, a latch 105 is provided to engage the flange 106 of collar 107, thus normally holding the disk 23 out of engagement with disk 22. When the knob 100 is pushed in, however, a contact 108 is closed to energize the latch relay 109 having a magnetic element which withdraws the latch 105 from the path of the flange 106.

When it is desired to change magazines, the switch 110 is moved from the "Reset" position (Figure 9) to the "Manual" position. This has the same effect as pushing in the knob 100, and after the disk 23 is brought into engagement with the disk 22 as above described, the magazine may be moved to its limit position so that it may be removed from the platform and a new magazine inserted. The switch is then moved to the "Reset" position and the apparatus is ready for normal operation.

It will be understood that the invention may be variously modified and embodied within the scope of the subjoined claims.

I claim as my invention:

1. Apparatus for projecting pictures from slides, comprising, a frame, a plurality of slide carriers movably mounted on said frame, a control rod mounted for rotational and sliding movement, means operable by sliding movement of said control rod for moving a selected slide carrier into and out of projection position, slide carrier selector means for moving said slide carriers to position any selected slide carrier in the plane of projection, said selector means being engaged by said rod when said rod is caused to slide to move a slide carrier out of projection position and being operated by rotation of said rod, and being disengaged from said rod when said rod is caused to slide to move a slide carrier into projection position.

2. Apparatus for projecting pictures from slides, comprising, a magazine, a plurality of slide carriers movably mounted therein, means for moving said magazine to bring any slide carrier therein to a position in the plane of projection, means exterior of said magazine for engaging any slide carrier lying in the plane of projection to move said slide carrier into and out of projecting position, and a control rod mounted for rotational and sliding movement in which rotational movement of said rod actuates said magazine moving means, and sliding movement of said rod actuates the means for moving said slide carriers.

3. Apparatus for projecting pictures from slides, comprising, a magazine, a plurality of slide carriers movably mounted therein, means for moving said magazine to bring any slide carrier therein to a position in the plane of projection, means exterior of said magazine for engaging any slide carrier lying in the plane of projection to move said slide carrier into and out of projecting position, and a control rod mounted for rotational and sliding movement, said control rod having a friction disk thereon, said magazine moving means including a friction disk, and in which sliding movement of said rod actuates the means for moving said slide carriers and brings said disks into engagement so that rotation of said rod actuates said magazine.

4. Apparatus for projecting pictures from slides, comprising a frame, a platform movably mounted on said frame, a magazine removably mounted on said platform, a plurality of slide carriers in said magazine, means for moving said platform and magazine along said frame to bring any selected slide carrier to the plane of projection, a rail on said frame, said magazine having a notch adapted to be engaged by said rail when said platform and magazine are moved along said frame to prevent removal of said magazine except when the end slide carrier is beyond the plane of projection.

5. Apparatus for projecting pictures from slides, comprising, a magazine, a plurality of slide carriers movably and pivotally mounted on a rod extending lengthwise of the magazine, said magazine being movably mounted so that a selected slide carrier therein may be moved to a position in the plane of projection, a driven shaft, means operated by said shaft on each revolution thereof to move said magazine a distance sufficient to bring the next successive slide carrier into the plane of projection, and means including a control rod mounted for rotational and sliding movement and operated by said shaft on each revolution thereof for sliding movement in one direction for moving a selected slide carrier in the plane of projection from projecting position into the magazine and subsequently during the same revolution for sliding movement in the other direction for moving another slide carrier in the plane of projection from the magazine into projecting position.

6. Apparatus as claimed in claim 5, including a shutter, and means operated by said shaft for operating said shutter.

7. Apparatus as claimed in claim 5, in which said shaft is driven by an electric motor, an electric circuit including said motor and a limit switch, and means on said shaft to open said switch to stop said motor when said shaft has made a complete revolution.

8. Apparatus as claimed in claim 5, in which said shaft is driven by a reversible electric motor so that said magazine may be moved in opposite directions, and an elecrtic circuit including two starting switches, one of which connects said motor for operation in one direction and the other of which connects said motor for operation in the opposite direction.

9. Apparatus as claimed in claim 5, in which said shaft is driven by an electric motor, an electric circuit including said motor and a limit switch, and means operated by said magazine moving means to open said limit switch when said magazine reaches the end of its intended travel in one direction.

10. Apparatus as claimed in claim 5, in which said shaft is driven by an electric motor, an electric circuit including said motor, a starting switch, and two limit switches, means on said shaft for opening one of said limit switches to stop said motor when said shaft has made part of a complete revolution, and means on said shaft for opening the other of said limit switches to stop said motor when said shaft has made the remainder of a complete revolution.

11. Apparatus for projecting pictures from slides, comprising, a magazine, a plurality of slide carriers movably mounted therein, said magazine being movably mounted so that any slide carrier therein may be moved to a position in the plane of projection, a driven shaft, means operated by said shaft on each revolution thereof to move said magazine a distance sufficient to bring the next successive slide carrier into the plane of projection, means including a control rod mounted for rotational and sliding movement and operated by said shaft on each revolution thereof for sliding movement in one direction to move any slide carrier in the plane of projection from projecting position into the magazine and subsequently during the same revolution for sliding movement in the other direction to move another slide carrier in the plane of projection from the magazine into projecting position, said control rod having means thereon which engages said magazine moving means when said rod is moved in the direction to move a slide carrier from projecting position into the magazine, so that said magazine moving means may be operated on rotation of said rod irrespective of rotation of said shaft.

References Cited in the file of this patent

UNITED STATES PATENTS

| | | |
|---|---|---|
| 594,819 | Allen | Nov. 30, 1897 |
| 998,305 | Roebuck | July 18, 1911 |
| 1,365,752 | Vischer | Jan. 18, 1921 |
| 1,402,791 | Petherick | Jan. 10, 1922 |
| 1,729,304 | Wagner | Sept. 24, 1929 |
| 1,880,028 | Tillyer et al. | Sept. 27, 1932 |
| 2,260,660 | Darwin | Oct. 28, 1941 |
| 2,375,706 | Stechbart et al. | May 8, 1945 |

FOREIGN PATENTS

| | | |
|---|---|---|
| 567,557 | France | Dec. 8, 1923 |
| 567,498 | Germany | Jan. 4, 1933 |